US012595680B1

(12) United States Patent
Wu

(10) Patent No.: US 12,595,680 B1

(45) Date of Patent: Apr. 7, 2026

(54) ANTI-MISOPERATION DOOR LOCK

(71) Applicant: Shaohui Wu, Xiamen (CN)

(72) Inventor: Shaohui Wu, Xiamen (CN)

( * ) Notice: Subject to any disclaimer, the term of this patent is extended or adjusted under 35 U.S.C. 154(b) by 0 days.

(21) Appl. No.: 19/232,848

(22) Filed: Jun. 9, 2025

(30) Foreign Application Priority Data

May 15, 2025 (CN) ........................ 202520958363.X

(51) Int. Cl.
*E05B 13/00* (2006.01)

(52) U.S. Cl.
CPC .................................. *E05B 13/005* (2013.01)

(58) Field of Classification Search
CPC ................. E05B 13/005; E05B 13/101; E05B 2047/0026; E05B 47/0676; E05B 17/044; E05B 15/04; E05B 15/101; E05B 55/06
USPC ........................................... 70/101, 189, 223
See application file for complete search history.

(56) References Cited

U.S. PATENT DOCUMENTS 4,108,482 A * 8/1978 Dietrich .................... E05C 1/16 292/336.5
5,904,232 A * 5/1999 Shen ..................... E05B 13/101 192/69.62
6,351,976 B1 * 3/2002 Chen ....................... E05B 13/10 292/336.3
6,527,314 B2 * 3/2003 Brown .................. E05B 13/005 292/336.3
7,377,143 B2 * 5/2008 Wang .................... E05B 17/005 70/467
10,422,162 B2 * 9/2019 Uhlmann ................ E05B 15/04
11,982,102 B2 * 5/2024 Komkin .................. E05B 85/10
2016/0251876 A1 * 9/2016 Carlsson ................ E05B 1/003 70/445

FOREIGN PATENT DOCUMENTS

AU 2011283430 A1 * 8/2012 ........... E05B 47/068
AU 2014216016 A1 * 9/2014 ............. E05B 47/06
CN 103758403 A * 4/2014 ............. E05B 47/00
CN 204343802 U * 5/2015 ............... E05B 3/00
(Continued)

OTHER PUBLICATIONS

CN115387672 Espacenet machine translation description and claims (Year: 2025).*
(Continued)

*Primary Examiner* — Kristina R Fulton

(57) ABSTRACT

An anti-misoperation door lock includes a door lock panel, a lock rod, a gripping assembly, a transmission member, a clutch assembly, and a switching assembly. The clutch assembly is movably arranged on the gripping assembly. The gripping assembly is configured to drive the clutch assembly to rotate. The clutch assembly is configured to move axially along the rotation axis under an external force. When the clutch assembly is in the initial state, the clutch assembly is spaced apart from the transmission member. When the clutch assembly is in the driving state, the clutch assembly is connected to the transmission member. When the switching assembly is in the first position, the clutch assembly is switchable between the initial state and the driving state. When the switching assembly is in the second position, the switching assembly is connected to the clutch assembly, and the clutch assembly is kept in the driving state.

17 Claims, 19 Drawing Sheets

(56) References Cited

FOREIGN PATENT DOCUMENTS

| | | | | | |
|---|---|---|---|---|---|
| CN | 204457090 | U | * | 7/2015 | E05B 17/22 |
| CN | 106593087 | A | * | 4/2017 | E05B 3/00 |
| CN | 107700944 | A | * | 2/2018 | E05B 13/005 |
| CN | 107724785 | A | * | 2/2018 | E05B 13/005 |
| CN | 107869276 | A | * | 4/2018 | E05B 17/22 |
| CN | 108457524 | A | * | 8/2018 | E05B 13/005 |
| CN | 109667473 | A | * | 4/2019 | E05B 3/003 |
| CN | 110145170 | A | * | 8/2019 | E05B 47/00 |
| CN | 110242103 | A | * | 9/2019 | E05B 47/00 |
| CN | 111691747 | A | * | 9/2020 | E05B 13/005 |
| CN | 111927214 | A | * | 11/2020 | E05B 15/0033 |
| CN | 112443198 | A | * | 3/2021 | E05B 9/002 |
| CN | 113236044 | A | * | 8/2021 | E05B 47/0012 |
| CN | 111719963 | B | * | 10/2021 | E05B 17/002 |
| CN | 113605786 | A | * | 11/2021 | E05B 13/106 |
| CN | 113738186 | A | * | 12/2021 | E05B 15/0033 |
| CN | 114922510 | A | * | 8/2022 | E05B 15/10 |
| CN | 115387672 | A | * | 11/2022 | E05B 13/005 |
| DE | 102018212701 | A1 | * | 1/2020 | E05B 85/10 |
| ES | 2241481 | B1 | * | 6/2006 | E05B 47/068 |
| FR | 2881163 | A1 | * | 7/2006 | E05B 13/005 |
| GB | 909884 | A | * | 11/1962 | E05B 1/0038 |
| GB | 2634894 | A | * | 4/2025 | E05B 55/06 |
| JP | H0741814 | Y2 | * | 9/1995 | E05B 13/10 |
| KR | 200284452 | Y1 | * | 8/2002 | E05B 49/00 |
| KR | 20100067217 | A | * | 6/2010 | E05B 47/00 |
| KR | 20100130807 | A | * | 12/2010 | E05B 13/005 |
| KR | 20110130545 | A | * | 12/2011 | E05B 1/0007 |
| KR | 101116329 | B1 | * | 3/2012 | E05B 17/2003 |
| KR | 101214002 | B1 | * | 12/2012 | E05B 47/0012 |
| KR | 101595853 | B1 | * | 2/2016 | E05B 15/00 |
| KR | 101758097 | B1 | * | 7/2017 | E05C 1/10 |
| SE | 530926 | C2 | * | 10/2008 | E05B 47/00 |
| SE | 1050275 | A1 | * | 9/2011 | E05B 47/0692 |
| TW | I575146 | B | * | 3/2017 | E05B 15/12 |
| WO | WO-9704203 | A1 | * | 2/1997 | E05B 47/068 |
| WO | WO-2004099640 | A2 | * | 11/2004 | E05B 47/0642 |

OTHER PUBLICATIONS

KR200284452 Espacenet machine translation description and claims (Year: 2025).*

* cited by examiner

ANTI-MISOPERATION DOOR LOCK

CROSS-REFERENCE TO RELATED APPLICATIONS

This application claims the priority of Chinese Patent Application No. 202520958363X, filed with the China National Intellectual Property Administration on May 15, 2025, the disclosure of which is hereby incorporated by reference in their entireties.

FIELD

The present disclosure relates to the field of door lock devices, and particularly to an anti-misoperation door lock.

BACKGROUND

In the field of door lock devices, some door lock products already have an anti-misoperation function. For example, users cannot open a door by directly rotating a handle indoors, and need to press a clutch assembly while rotating the handle to drive a lock rod to rotate, thereby achieving door opening and preventing accidental opening by young children or pets. However, the anti-misoperation function of such anti-misoperation handle is always enabled and cannot be flexibly switched according to actual needs.

In practical usage scenarios, users and environments of door locks may change dynamically. Since anti-misoperation door locks in related art lack a mechanism to switch a working state of the indoor handle, the anti-misoperation door locks in the related art have a poor flexibility during use, thereby limiting an application scope of the anti-misoperation door locks.

SUMMARY

The present disclosure provides an anti-misoperation door lock. The anti-misoperation door lock includes a door lock panel, a lock rod, a gripping assembly, and a transmission member. The gripping assembly is rotatable relative to the door lock panel. The lock rod is connected to the transmission member. The transmission member is configured to drive the lock rod to rotate when the transmission member rotates. The anti-misoperation door lock further includes a clutch assembly and a switching assembly. The clutch assembly is movably arranged on the gripping assembly. The gripping assembly is configured to drive the clutch assembly to rotate about a rotation axis of the gripping assembly when the gripping assembly rotates. The clutch assembly is configured to move axially along the rotation axis of the gripping assembly under an external force. The clutch assembly has an initial state and a driving state. When the clutch assembly is in the initial state, the clutch assembly is spaced apart from the transmission member. When the clutch assembly is in the driving state, the clutch assembly is connected to the transmission member. The switching assembly has at least a first position and a second position relative to the gripping assembly and selectively arranged in the first position or the second position. When the switching assembly is in the first position, the clutch assembly is switchable between the initial state and the driving state. When the switching assembly is in the second position, the switching assembly is connected to the clutch assembly, and the clutch assembly is kept in the driving state.

BRIEF DESCRIPTION OF THE DRAWINGS

To provide a clearer illustration of the technical solutions in the embodiments of the present disclosure or in the related art, a brief introduction will be given to the drawings used in the description of the embodiments or the related art. It is obvious that the drawings described below are merely some embodiments of the present disclosure, and for those skilled in the art, other drawings can be obtained based on these drawings without creative efforts.

REFERENCE NUMERALS IN THE DRAWINGS

- 10, indoor door lock; 20, outdoor door lock;
- 1, door lock panel; 11, first limiting protrusion;
- 2, lock rod;
- 3, gripping assembly; 30, mounting cavity; 31, handle; 311, first hole; 312, second hole; 313, third hole; 314, gripping portion; 32, mounting member; 321, first chamber; 322, second chamber; 323, third chamber; 33, intermediate member; 331, second limiting protrusion; 332, positioning slot; 333, first channel; 334, second channel; 34, fixing member; 341, fourth hole; 35, third connection structure; 36, fixing bolt; 37, rotation axis;
- 4, transmission member; 41, first end; 42, second end; 421, polygonal shaft hole;

5, clutch assembly; 51, clutch shaft; 510, working portion; 511, polygonal column; 512, first abutting face; 52, driving member; 521, head portion; 522, rod portion; 53, first reset member; 54, second reset member; 55, connecting member;

6, switching assembly; 61, abutting member; 611, second abutting face; 62, operating member; 63, first connection structure; 64, second connection structure; 65, switch; 66, driving device; 67, push pin;

7, latch.

DETAILED DESCRIPTION

Unless otherwise defined, all technical and scientific terms used herein have the same meaning as commonly understood by those skilled in the art to which the present disclosure belongs. The terms used in the description of the present disclosure herein are intended for describing particular embodiments only and are not intended to limit the present disclosure. In the description, claims, and the above drawings of the present disclosure, the terms "including" and "having", as well as their variants, are intended to convey a non-exclusive inclusion. The terms "first", "second", etc., as used herein, are intended to distinguish between different objects, rather than to describe a particular order.

Reference to "embodiments" herein implies that a particular feature, structure, or characteristic described in conjunction with an embodiment may be included in at least one embodiment of the present disclosure. The appearance of the phrase at various places in the specification does not necessarily refer to the same embodiment, nor is it a separate or an alternative embodiment that is mutually exclusive of other embodiments. One skilled in the art would explicitly and implicitly understand that the embodiments described herein can be combined with other embodiments.

In order to enable those skilled in the art to better understand the technical solutions of the present disclosure, the technical solutions in the embodiments of the present disclosure will be clearly and completely described below with reference to the accompanying drawings.

Figure 1:
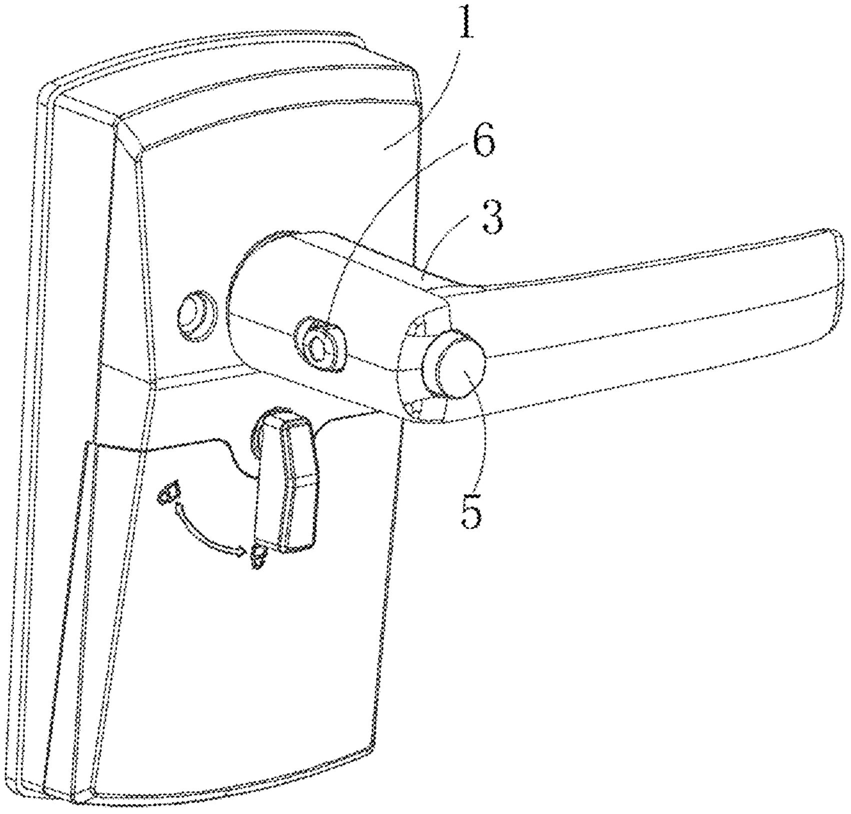
FIG. 1 is a schematic view of an overall structure of an anti-misoperation door lock according to an embodiment of the present disclosure.
Figure 2:
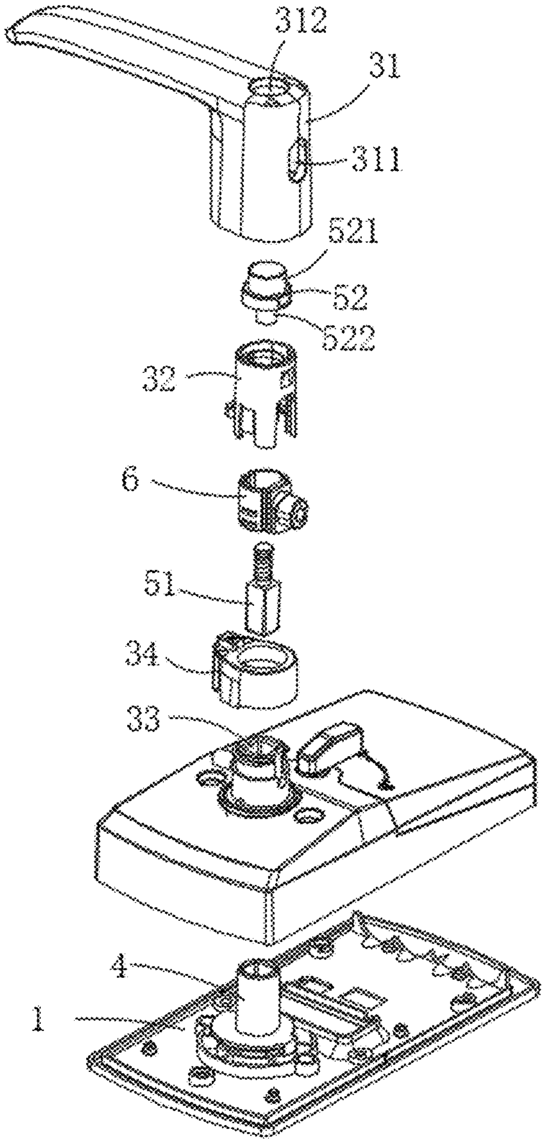
FIG. 2 is an exploded view of the anti-misoperation door lock according to an embodiment of the present disclosure.
Figure 13:
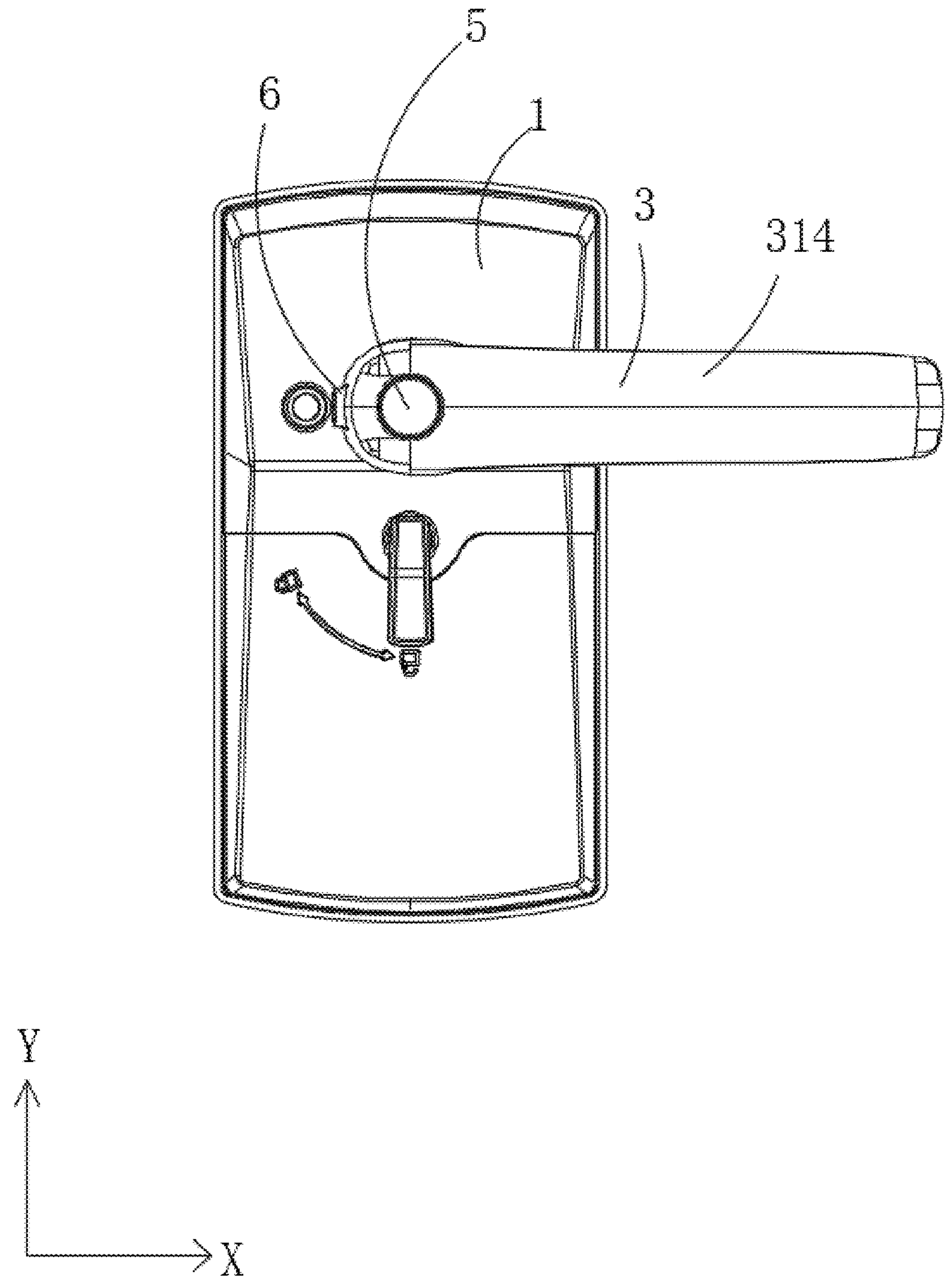
FIG. 13 is a structural view of a gripping portion of a handle according to an embodiment of the present disclosure, with the gripping portion in a horizontal state.
Figure 16:
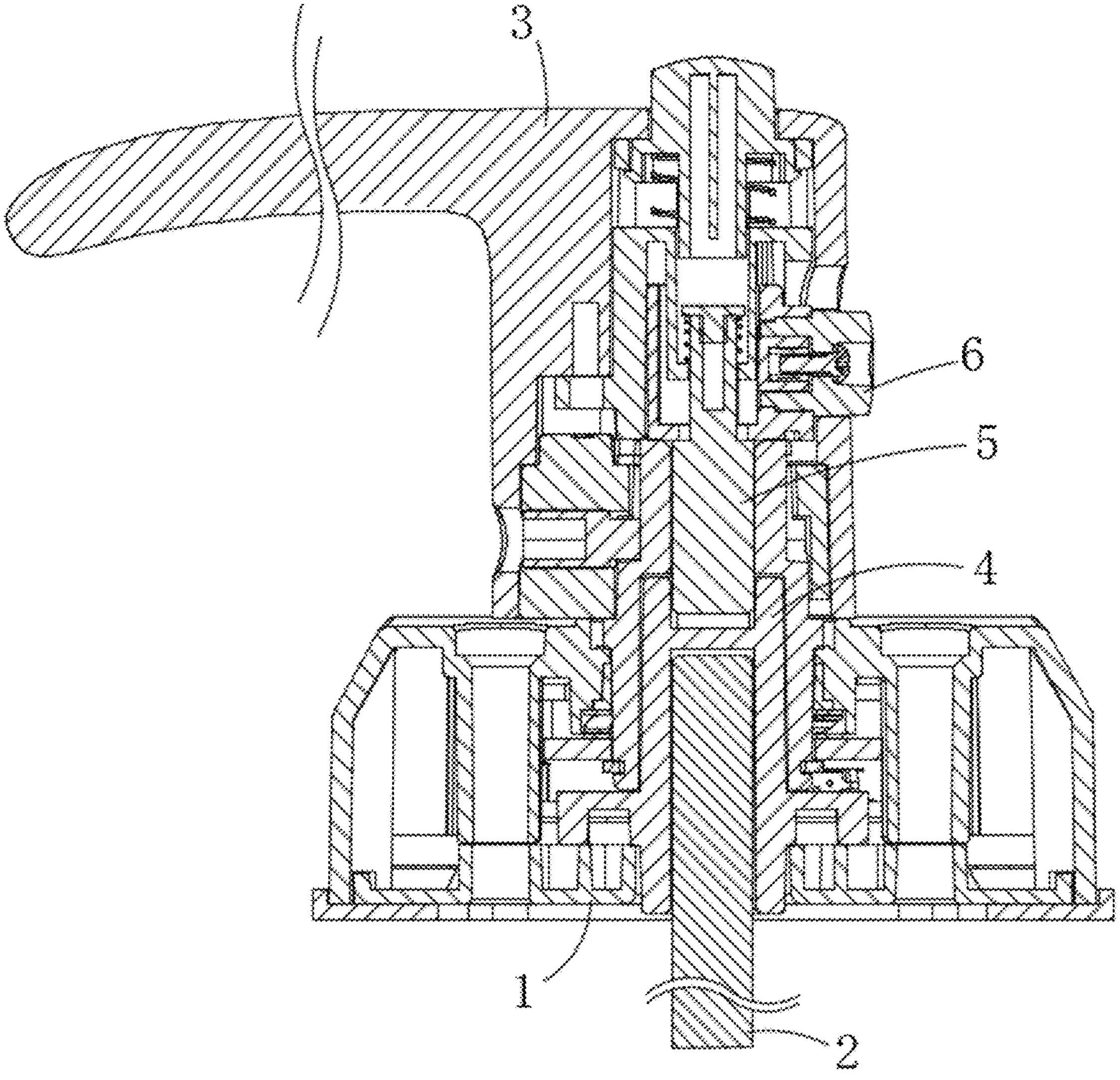
FIG. 16 is further another cross-sectional view of the anti-misoperation door lock according to an embodiment of the present disclosure.
Figure 17:
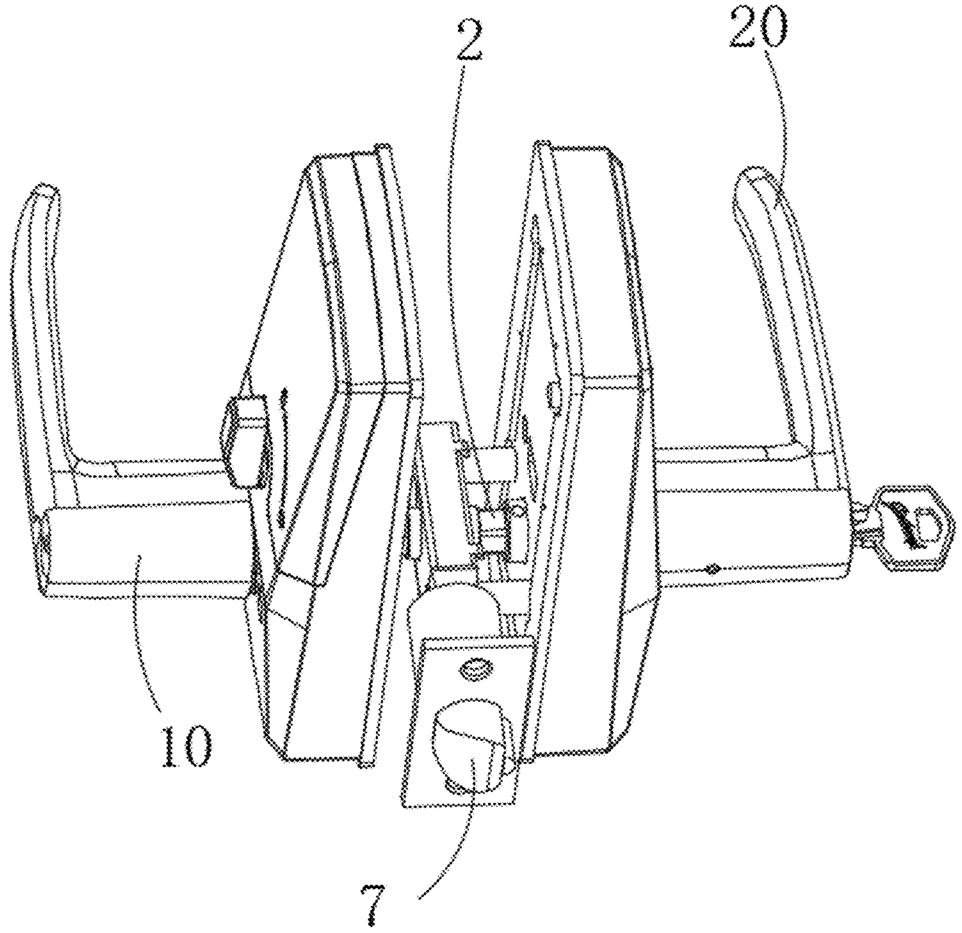
FIG. 17 is an assembly view of an outdoor handle and an indoor handle according to an embodiment of the present disclosure.

Referring to FIGS. 1, 2, and 16, the present disclosure provides an anti-misoperation door lock. The anti-misoperation door lock includes a door lock panel 1, a lock rod 2, a gripping assembly 3, and a transmission member 4. The gripping assembly 3 is rotatable relative to the door lock panel 1. The lock rod 2 is connected to the transmission member 4. When the transmission member 4 rotates, the transmission member 4 is configured to drive the lock rod 2 to unlock. Regarding an unlocking mechanism, please refer to FIG. 17, the anti-misoperation door lock further includes a latch 7. In one embodiment, the anti-misoperation door lock can be used as an indoor door lock 10. An outdoor door lock 20 is mounted opposite to the indoor door lock 10. The indoor door lock 10 and the outdoor door lock 20 are connected to a same lock rod 2. The lock rod 2 is drivingly connected to the latch 7. A rotation of the lock rod 2 causes the latch 7 to extend outward or retract inward, achieving unlocking or locking. FIG. 13 is a structural view of the anti-misoperation door lock, where a X direction is a horizontal direction, and a Y direction is a vertical direction.

The anti-misoperation door lock further includes a clutch assembly 5. The gripping assembly 3 defines a mounting cavity 30. The clutch assembly 5 is arranged in the mounting cavity 30. When the gripping assembly 3 is rotated, the clutch assembly 5 is driven by the gripping assembly 3 to rotate synchronously about a rotation axis 37 of the gripping assembly 3. Moreover, the clutch assembly 5 can also be driven by an external force to move axially along the rotation axis 37 of the gripping assembly 3, such that the clutch assembly 5 has an initial state and a driving state. When the clutch assembly 5 is in the initial state, the clutch assembly 5 is spaced apart from the transmission member 4, and rotating the gripping assembly 3 cannot drive the lock rod 2 to unlock. When the clutch assembly 5 is in the driving state, the clutch assembly 5 is connected to the transmission member 4, and rotating the gripping assembly 3 can drive the lock rod 2 to unlock.

The clutch assembly 5 can switch from the initial state to the driving state under the external force. The external force may come from a user's operation of the clutch assembly 5, such as pressing the clutch assembly 5, which can cause the clutch assembly 5 to move toward the transmission member 4 and eventually connect with the transmission member 4. When the clutch assembly 5 is connected to the transmission member 4, i.e., the clutch assembly 5 is in the driving state, rotating the gripping assembly 3 can cause the gripping assembly 3 and the clutch assembly 5 mounted in the mounting cavity 30 to rotate synchronously, and since the transmission member 4 rotates through the clutch assembly 5, the transmission member 4 drives the lock rod 2 to unlock.

Figure 3:
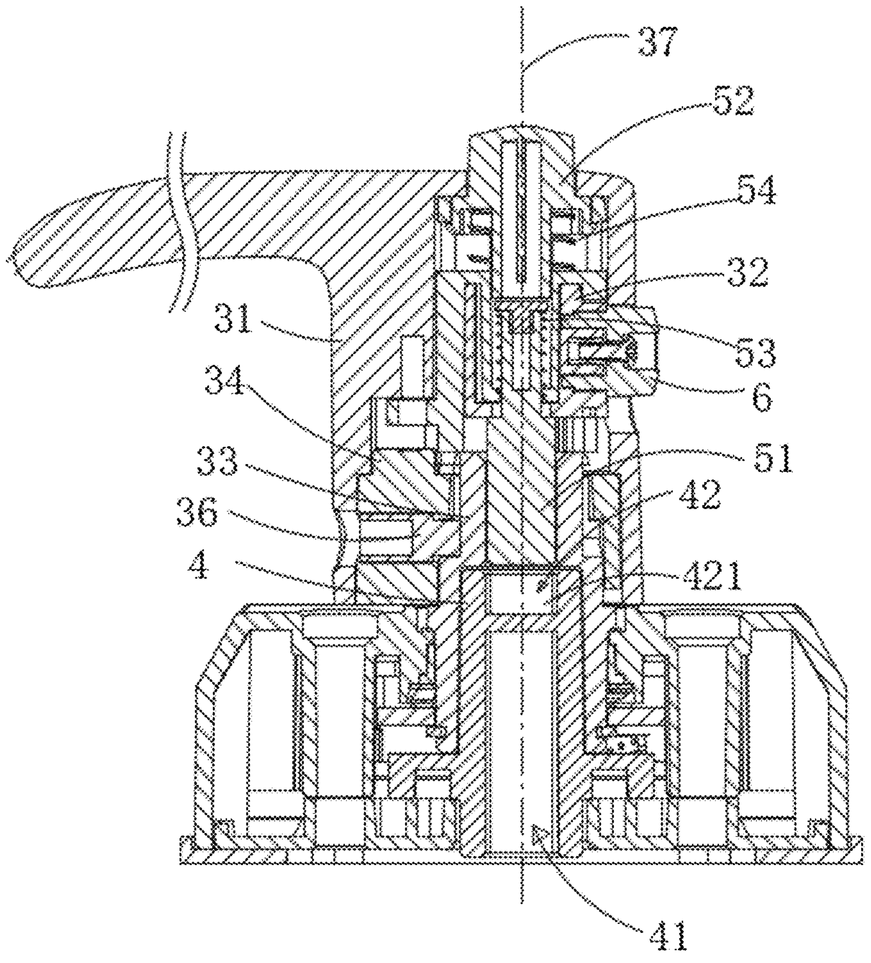
FIG. 3 is a cross-sectional view of the anti-misoperation door lock according to an embodiment of the present disclosure, with a switching assembly in a first position.
Figure 4:
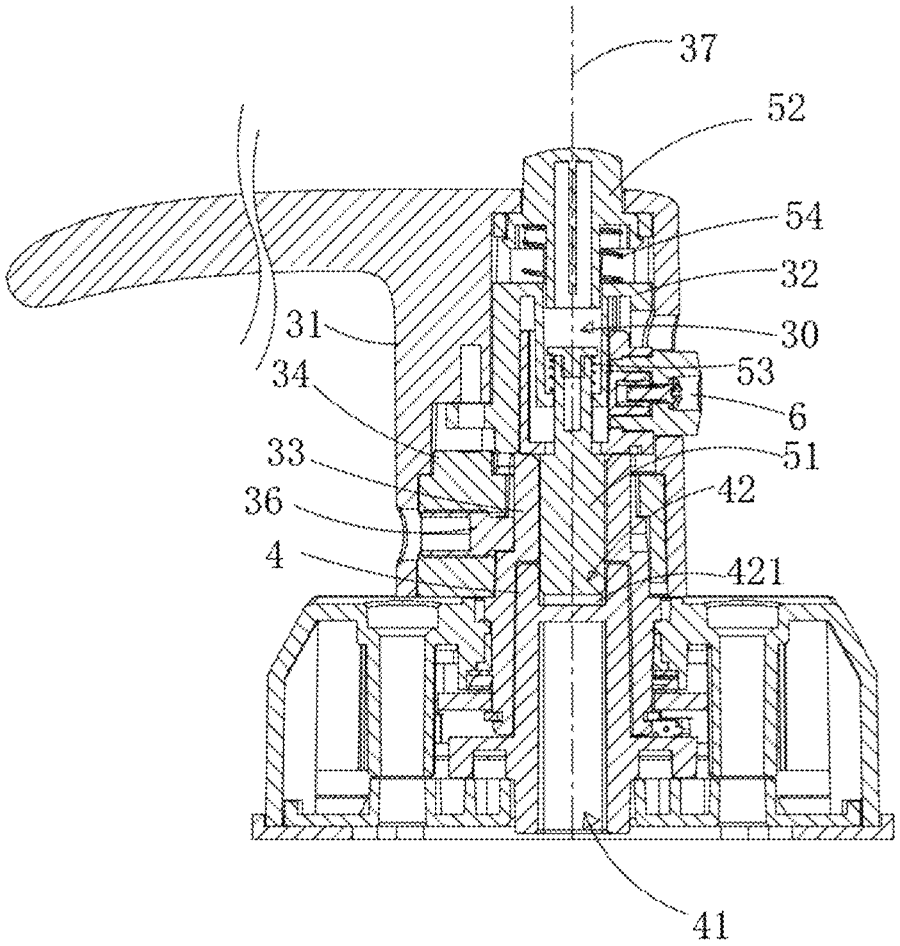
FIG. 4 is another cross-sectional view of the anti-misoperation door lock according to an embodiment of the present disclosure, with the switching assembly in a second position.

The clutch assembly 5 can return from the driving state to the initial state under the external force, or the clutch assembly 5 has elasticity and can return from the driving state to the initial state under an elastic force. When the clutch assembly 5 returns from the driving state to the initial state, the clutch assembly 5 is disconnected from the transmission member 4, and there is no connection between the clutch assembly 5 and the transmission member 4. At this time, rotation of the gripping assembly 3 cannot drive the transmission member 4 to rotate through the clutch assembly 5. Referring to FIGS. 3 and 4, to enable the anti-misoperation function to be turned on or off, allowing users to use the anti-misoperation door lock as an ordinary door lock according to actual needs, the anti-misoperation door lock further includes a switching assembly 6. The switching assembly 6 has at least a first position and a second position relative to the gripping assembly 3, and the switching assembly 6 can be selectively maintained in the first position or the second position. When the switching assembly 6 is in the first position, the clutch assembly 5 can switch between the initial state and the driving state, and the user needs to apply the external force to drive the clutch assembly 5 to move. In this way, the anti-misoperation function can be achieved through the user's conscious application of the external force to the clutch assembly 5. When the switching assembly 6 is in the second position, the switching assembly 6 remains connected to the clutch assembly 5, keeping the clutch assembly 5 in the driving state. At this time, the anti-misoperation function of the anti-misoperation door lock is turned off, meaning that when the switching assembly 6 is switched to the second position, the anti-misoperation door lock is used as an ordinary door lock, the user does not need to apply the external force to the clutch assembly 5, and simply rotating the gripping assembly 3 can unlock the door, or even if the external force is applied to the clutch assembly 5, a state of the clutch assembly 5 cannot be changed. In one embodiment, the switching assembly 6 is mounted on the gripping assembly 3, and at least a part of the switching assembly 6 is exposed out of the gripping assembly 3. The user can operate the part of the switching assembly 6 that is exposed out of the gripping assembly 3 to switch the switching assembly 6 between the first position and the second position. A part of the clutch assembly 5 is located between the switching assembly 6 and the transmission member 4, and this part is a working portion 510. Since the working portion 510 is connected with the transmission member 4, a state switching of the clutch assembly 5 is reflected in a positional change of the working portion 510. When the switching assembly 6 is in the second position, the switching assembly 6 is closer to the transmission member 4 than in the first position, i.e., when the switching assembly 6 is in the first position, the switching assembly 6 is farther from the transmission member 4, reserving space for the working portion 510 to move, allowing the working portion 510 to change position and thereby achieving the state switching of the clutch assembly 5. When the switching assembly 6 is in the second position, a space between the switching assembly 6 and the transmission member 4 is insufficient for the working portion 510 to move, meaning the working portion 510 cannot change position, i.e., the clutch assembly 5 can only be in the driving state.

Figure 7:
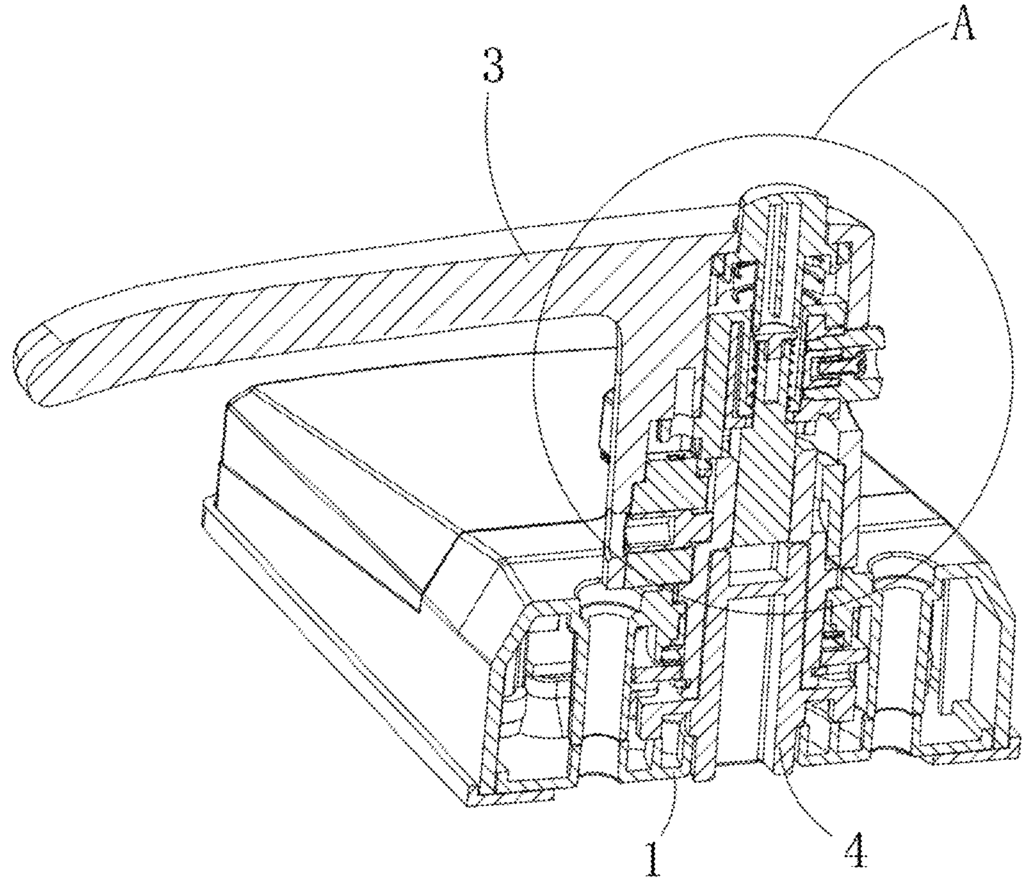
FIG. 7 is further another exploded view of the anti-misoperation door lock according to an embodiment of the present disclosure.
Figure 8:
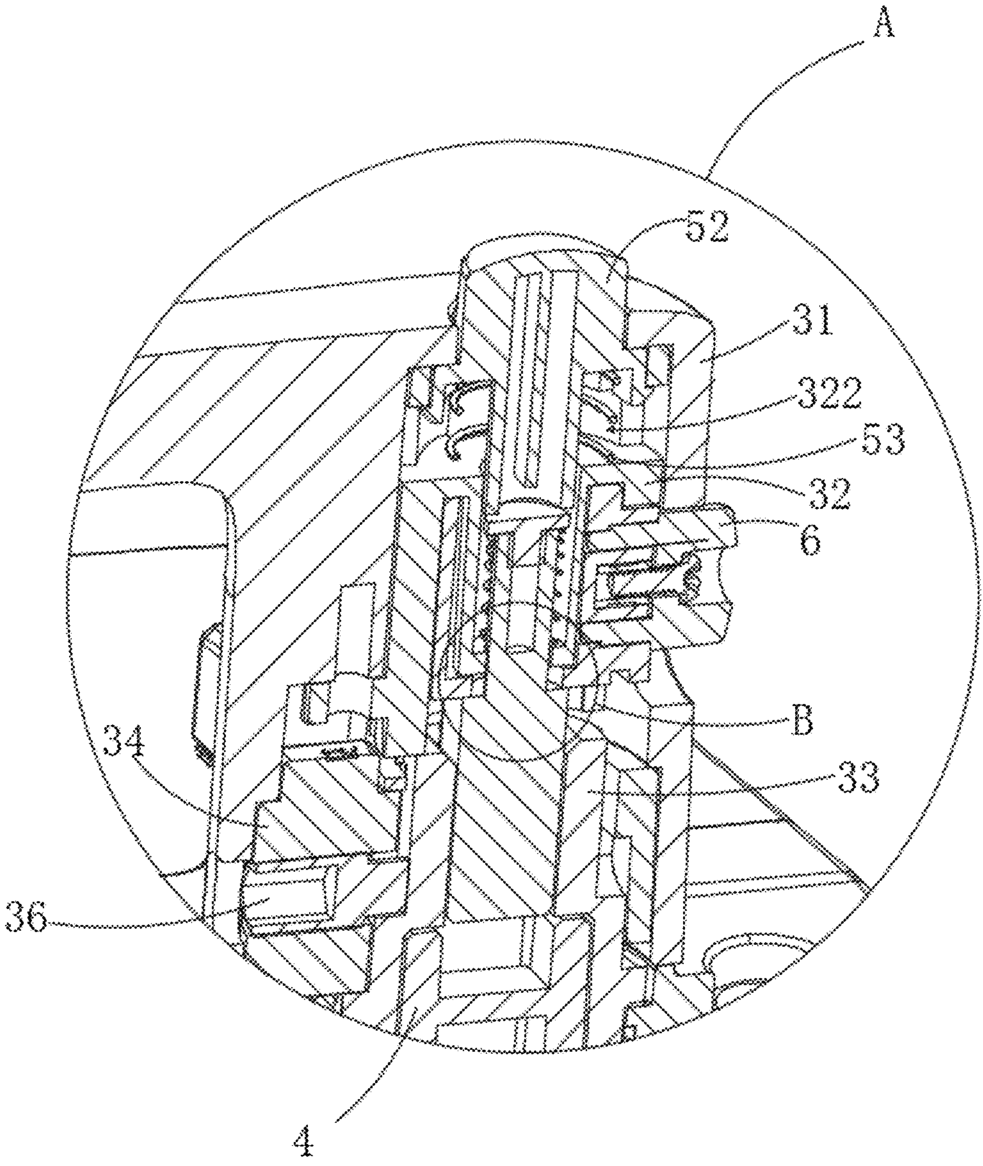
FIG. 8 is an enlarged view of a portion A in FIG. 7.
Figure 9:
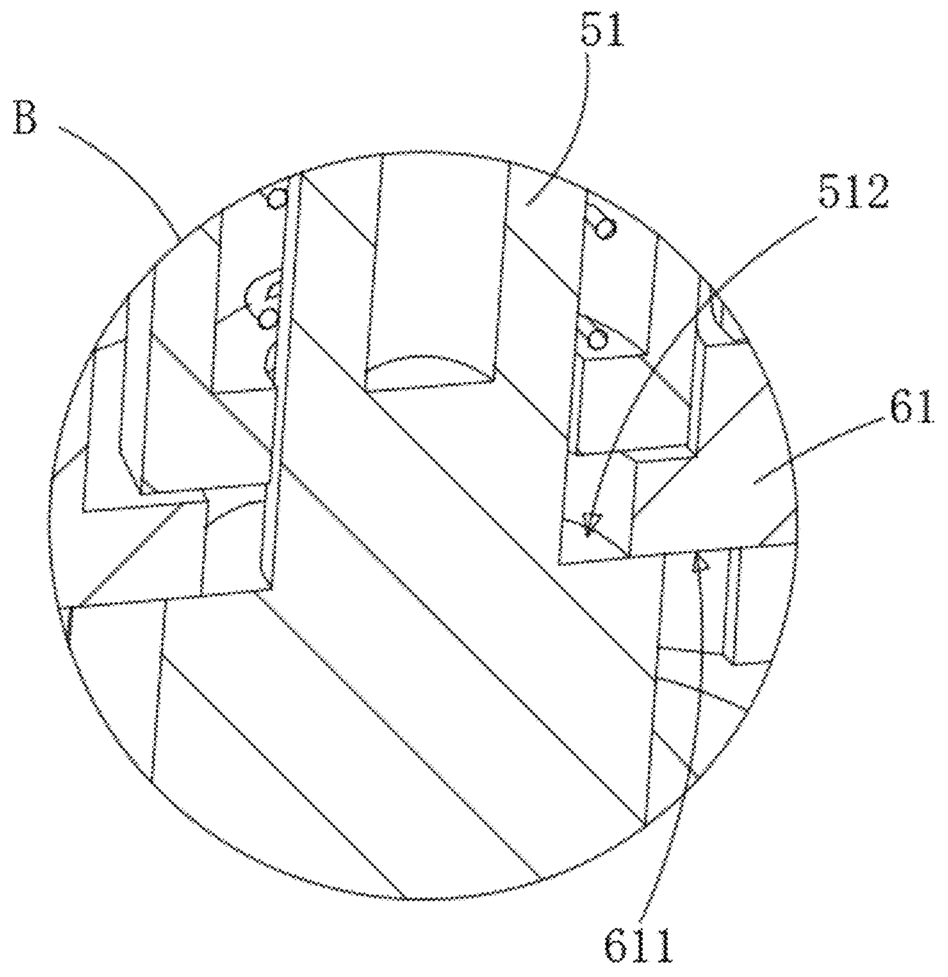
FIG. 9 is an enlarged view of a portion B in FIG. 8.

Referring to FIGS. 7 to 9, in some embodiments, the clutch assembly 5 has a first abutting face 512 on the working portion 510, and the first abutting face 512 is arranged facing away from the transmission member 4. The switching assembly 6 has a second abutting face 611, and the second abutting face 611 is arranged facing the first abutting face 512. When the switching assembly 6 is in the first position and the clutch assembly 5 is in the initial state, the second abutting face 611 abuts against the first abutting face 512. When the switching assembly 6 is in the first position and the clutch assembly 5 is in the driving state, the working portion 510 is connected to the transmission member 4 under the external force, thus the first abutting face 512 is spaced apart from the second abutting face 611. When the switching assembly 6 is switched to the second position, the first abutting face 512 abuts against the second abutting face 611, and the user no longer needs to apply the external force to the clutch assembly 5 to directly drive the transmission member 4.

Figure 18:
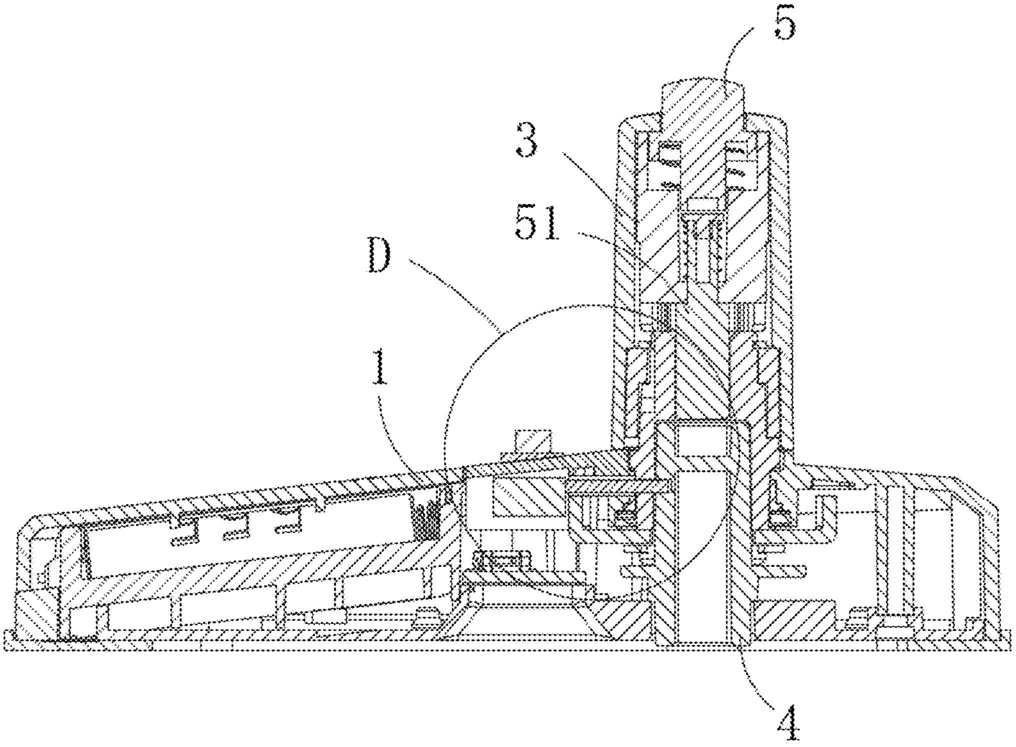
FIG. 18 is a structural view of the switching assembly mounted on the door lock panel according to an embodiment of the present disclosure.
Figure 19:
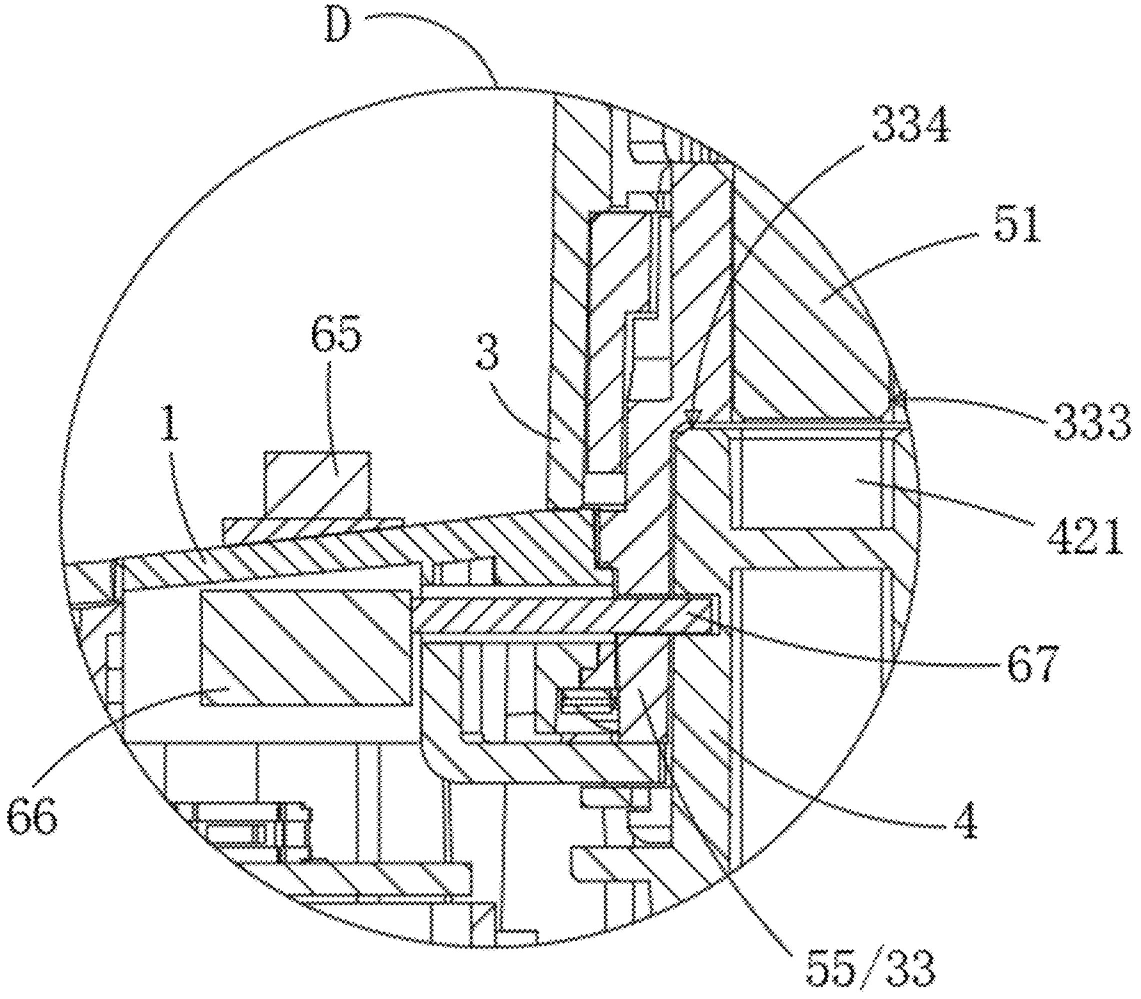
FIG. 19 is an enlarged view of a portion D in FIG. 18.

In other embodiments, referring to FIGS. 18 and 19, the switching assembly 6 can also be mounted on the door lock panel 1. The clutch assembly 5 includes a clutch shaft 51 and a connecting member 55. The clutch shaft 51 is slidably connected to the connecting member 55, and the connecting member 55 is rotationally locked with the clutch shaft 51. When the gripping assembly 3 rotates, the gripping assembly 3 can drive the connecting member 55 and the clutch shaft 51 to rotate together about the rotation axis 37 of the gripping assembly 3. The switching assembly 6 includes an push pin 67, and the connecting member 55 and the transmission member 4 can be connected to each other through the push pin 67. At this time, the state switching of the clutch assembly 5 is reflected in a positional change of the push pin 67, rather than the positional change of the working portion 510 described above. When the switching assembly 6 is in the first position, the push pin 67 is only inserted in the connecting member 55 and is not connected with the transmission member 4, meaning that directly rotating the gripping assembly 3 cannot drive the transmission member 4 and the lock rod 2 to rotate and unlock the door. At this time, the external force needs to be applied to the clutch assembly 5 to make the clutch shaft 51 move axially along the rotation axis 37 of the gripping assembly 3 to connect or disconnect with the transmission member 4, achieving the state switching of the clutch assembly 5 between the initial state and the driving state. When the switching assembly 6 is in the second position, the push pin 67 passes through the connecting member 55 and is inserted in the transmission member 4, thus the connecting member 55 and the transmission member 4 can be rotationally locked with each other, keeping the clutch assembly 5 in the driving state. At this time, directly rotating the gripping assembly 3 causes the clutch shaft 51, the connecting member 55, the transmission member 4, and the lock rod 2 to rotate together to unlock the door. In one embodiment, at least a part of the switching assembly 6 is exposed out of the door lock panel 1, and the user can operate the part of the switching assembly 6 exposed out of the door lock panel 1 to directly drive the push pin 67 to switch between the first position and the second position. Alternatively, in other embodiments, please continue to refer to FIG. 19, the switching assembly 6 further includes a switch 65 and a driving device 66. At least a part of the switch 65 is exposed out of the door lock panel 1, and at least a part of the driving device 66 is mounted in the door lock panel 1. The switch 65 can be electrically connected to the driving device 66, and the driving device 66 is drivingly connected to the push pin 67. When the user presses or toggles the switch 65, the driving device 66 can drive the push pin 67 to make a position change.

In some embodiments, the anti-misoperation door lock further includes a first connection structure 63, a second connection structure 64, and a third connection structure 35. Each of the first connection structure 63 and the second connection structure 64 is arranged on one of the switching assembly 6 and the gripping assembly 3, while the third connection structure 35 is arranged on the other of the switching assembly 6 and the gripping assembly 3. The third connection structure 35 can be selectively connected with one of the first connection structure 63 and the second connection structure 64. When the third connection structure 35 is connected to the first connection structure 63, the switching assembly 6 is in the first position; when the third connection structure 35 is connected to the second connection structure 64, the switching assembly 6 is in the second position.

Figure 5:
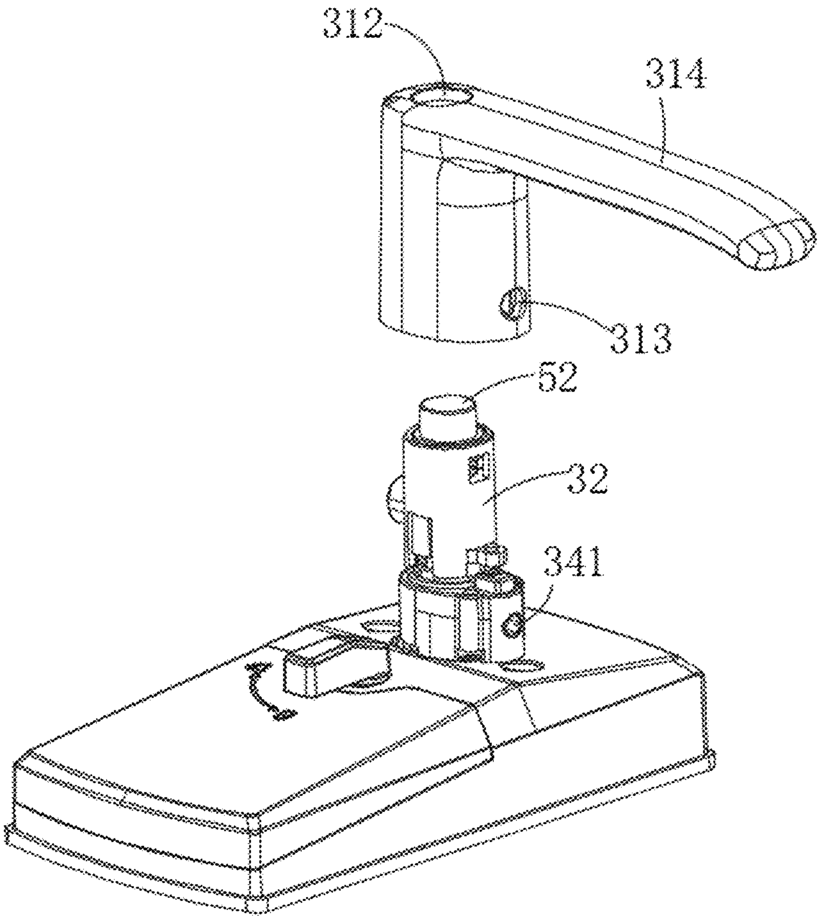
FIG. 5 is another exploded view of the anti-misoperation door lock according to an embodiment of the present disclosure.

Referring to FIG. 5, in one embodiment, a connection between the first connection structure 63 and the third connection structure 35 can be achieved through buckle engagement, and a connection between the second connection structure 64 and the third connection structure 35 can also be achieved through buckle engagement. Here, the third connection structure 35 is a buckle arranged on an inner wall of the gripping assembly 3, and each of the first connection structure 63 and the second connection structure 64 is formed on an outer wall of the switching assembly 6. The first connection structure 63 is a first slot, the second connection structure 64 is a second slot, and the first slot and the second slot are distributed along an axial direction of the rotation axis 37 of the gripping assembly 3. The buckle can be selectively engaged in either of the first slot and the second slot, thereby keeping the switching assembly 6 in the first position or the second position. In another embodiment, each of the first connection structure 63 and the second connection structure 64 is formed in the inner wall of the gripping assembly 3, while the third connection structure is arranged on the outer wall of the switching assembly 6. That is, the positions of the buckle and the slots can be exchanged while achieving a same connection function.

In addition to the buckle engagement manner, the connection between the switching assembly 6 and the gripping assembly 3 can also be achieved through other means, including a threaded connection, a magnetic attraction, etc. For example, when the threaded connection is adopted, the first connection structure 63 is a first section of external threads, the second connection structure 64 is a second section of external threads, and the first section of external threads and the second section of external threads are arranged axially along the rotation axis 37 on the switching assembly 6. The third connection structure 35 is an internal thread meshed with the first connection structure 63 and the second connection structure 64 and is arranged on the gripping assembly 3. When the switching assembly 6 rotates relative to the gripping assembly 3, the switching assembly 6 can be switched between the first position and the second position. For another example, when the magnetic attraction is adopted, each of the first connection structure 63, the second connection structure 64, and the third connection structure 35 can be a magnet. The third connection structure 35 can be magnetically attracted to either the first connection structure 63 or the second connection structure 64.

Figure 6:
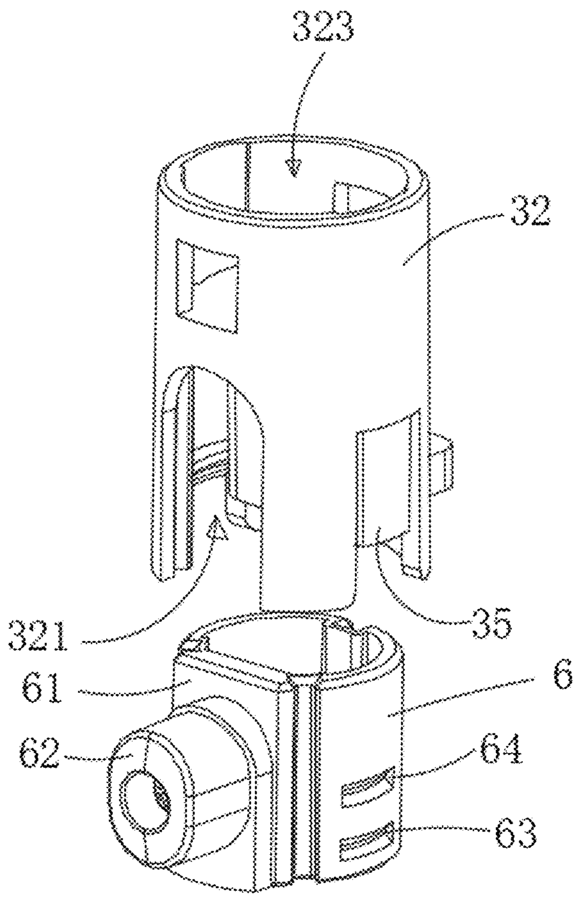
FIG. 6 is an exploded view of the switching assembly and a mounting member according to an embodiment of the present disclosure.

Regarding the structure of the switching assembly 6, please refer to FIG. 6 in combination, in one embodiment, the switching assembly 6 includes an abutting member 61 and an operating member 62. The abutting member 61 is arranged in the mounting cavity 30. The second abutting face 611 is formed on the abutting member 61, and the second abutting face 611 is configured to face or abut against the first abutting face 512 on the clutch assembly 5. The gripping assembly 3 defines a first hole 311, and the operating member 62 is fixedly connected to the abutting member 61, with at least a portion of the operating member 62 extending out of the first hole 311, exposing the operating member 62 out of the gripping assembly 3. The operating member 62 can drive the abutting member 61 to switch between the first position and the second position when the operating member 62 is gripped and operated by the user, thereby achieving a switching control of the switching assembly 6. In this embodiment, the first hole 311 is an elongated hole extending along the axial direction of the rotation axis 37, providing a necessary movement space for the operating member 62. Additionally, the operating member 62 and the abutting member 61 can be integrally formed as a one-piece structure or connected with each other through a screw, a buckle, adhesive, etc., to facilitate manufacturing and assembly.

In some embodiments, the operating member 62 extends in a direction perpendicular to the rotation axis 37 of the gripping assembly 3, and passes through the first hole 311 to be exposed out of the gripping assembly 3. In other words, an extension direction of the operating member 62 is perpendicular to a direction in which the user applies the external force to the clutch assembly 5. This allows the user to clearly distinguish between functions of the clutch assembly 5 and the switching assembly 6 during switching operation, ensuring operational independence between the clutch assembly 5 and the switching assembly 6 and reducing a risk of misoperation.

Figure 11:
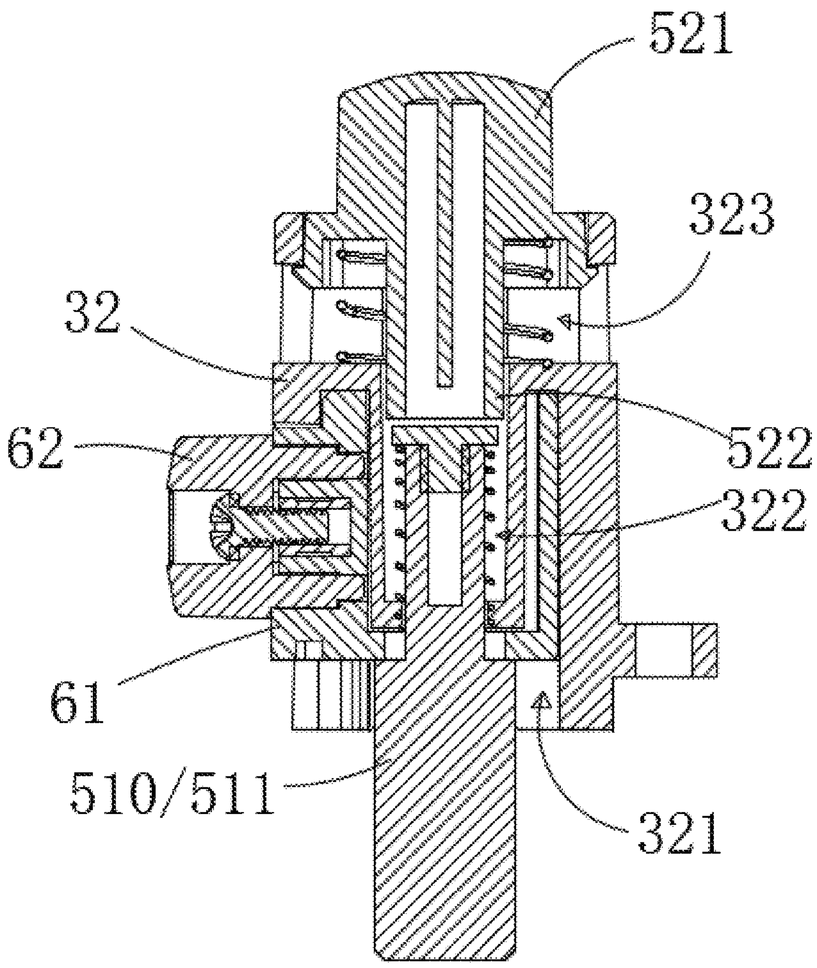
FIG. 11 is a structural view of a clutch assembly according to an embodiment of the present disclosure.

Regarding a structure of the clutch assembly 5, please refer to FIG. 11, in some embodiments, the clutch assembly 5 includes a clutch shaft 51, a driving member 52, and a first reset member 53. The clutch shaft 51 is slidably arranged in the mounting cavity 30, the working portion 510 and the first abutting face 512 are arranged on the clutch shaft 51. The driving member 52 includes a head portion 521 and a rod portion 522. The gripping assembly 3 defines a second hole 312, and at least a part of the head portion 521 passes through the second hole 312 and is exposed out of the gripping assembly 3. When the switching assembly 6 is in the first position, the user applies the external force to press the head portion 521, causing the rod portion 522 of the driving member 52 to abut against the clutch shaft 51. At this time, both the driving member 52 and the clutch shaft 51 can slide along the rotation axis 37 of the gripping assembly 3 toward the transmission member 4, enabling the clutch shaft 51 to be connected to the transmission member 4. The first reset member 53 is located in the mounting cavity 30 and is connected to the clutch shaft 51 and the gripping assembly 3. The first reset member 53 is configured to drive the clutch shaft 51 to move away from the transmission member 4. After the user releases the external force on the head portion 521, the first reset member 53 drives the clutch shaft 51 to separate from the transmission member 4, and the clutch shaft 51 returns to an initial state. When the switching assembly 6 is in the second position, the clutch shaft 51 remains connected to the transmission member 4, and the first reset member 53 is always in a state of storing elastic potential energy. When the switching assembly 6 returns to the first position, the first reset member 53 drives the clutch shaft 51 to reset. It should be noted that the clutch assembly 5 can be driven toward the transmission member 4 in various ways. For example, the external force can come not only from the user's direct pressing operation on the clutch assembly 5 but also from a threaded connection, a sliding connection, or other methods, as long as the clutch assembly 5 is enabled to move toward the transmission member 4, and such operations shall be regarded as achieving force transmission.

In some embodiments, the clutch shaft 51 and the driving member 52 are independent and separable, and the clutch assembly 5 further includes a second reset member 54. The first reset member 53 and the second reset member 54 act on different objects: the first reset member 53 is configured to reset the clutch shaft 51, while the second reset member 54 is configured to reset the driving member 52. Specifically, the second reset member 54 is located in the mounting cavity 30 and is connected to the driving member 52 and the gripping assembly 3. The second reset member 54 is configured to drive the driving member 52 to move outward from the gripping assembly 3. When the user applies the external force to make the driving member 52 contact with the clutch shaft 51, the second reset member 54 is compressed. After the external force is released, the second reset member 54 drive the driving member 52 to return to an original position via elasticity of the second reset member 54. When the switching assembly 6 is in the second position, after the driving member 52 is pressed, the driving member 52 can not reset via elasticity of the first reset member 53. Therefore, the second reset member 54 is configured to drive the head portion 521 of the driving member 52 to extend out of the second hole 312 again. In one embodiment, the first reset member 53 and/or the second reset member 54 are compression springs.

In other embodiments, the clutch assembly 5 may not include the driving member 52 which is independently arranged. Instead, the driving member 52 and the clutch shaft 51 may be connected with each other via a bolt, an adhesive, or other means, or the driving member 52 and the clutch shaft 51 may be integrally formed as a single component.

Referring to FIGS. 2 and 11, in some embodiments, the gripping assembly 3 includes a handle 31 and a mounting member 32. The mounting cavity 30 is formed in the handle 31, and the mounting member 32 is fixedly mounted in the mounting cavity 30. The mounting member 32 is configured to secure the clutch assembly 5 and the switching assembly 6 in the mounting cavity 30 of the handle 31. On one hand, the handle 31 provides a gripping portion 314 for the user to perform operations such as rotation and pressing. The handle 31 can drive the mounting member 32, the clutch assembly 5, and the switching assembly 6 mounted in the handle 31 to rotate together when the handle 31 rotates. In addition, the mounting cavity 30 is formed in the handle 31, and can protect an internal structure in the mounting cavity 30 and prevents dust or foreign objects from entering the mounting cavity 30. In one embodiment, the mounting member 32 defines a first chamber 321 for accommodating the switching assembly 6. The third connection structure 35 is arranged on a chamber wall of the switching assembly 6 corresponding to the first chamber 321. Each of the first connection structure 63 and the second connection structure 64 is arranged on an outer wall of the switching assembly 6. The mounting member 32 also defines a second chamber 322 for accommodating the first reset member 53 and a third chamber 323 for accommodating the second reset member 54. The second chamber 322 and the third chamber 323 are communicated to each other. The rod portion 522 of the driving member 52 extends from the third chamber 323 to the second chamber 322, and the clutch shaft 51 is at least partially located in the second chamber 322 and connected to the first reset member 53. When the user presses the head portion 521 of the driving member 52, the rod portion 522 and the clutch shaft 51 abut against each other in the second chamber 322 and move together toward the transmission member 4. After the external force is released, the driving member 52 resets under an action of the second reset member 54, the clutch shaft 51 resets under an action of the first reset member 53, and the driving member 52 and the clutch shaft 51 separate from each other in the second chamber 322.

Figure 10:
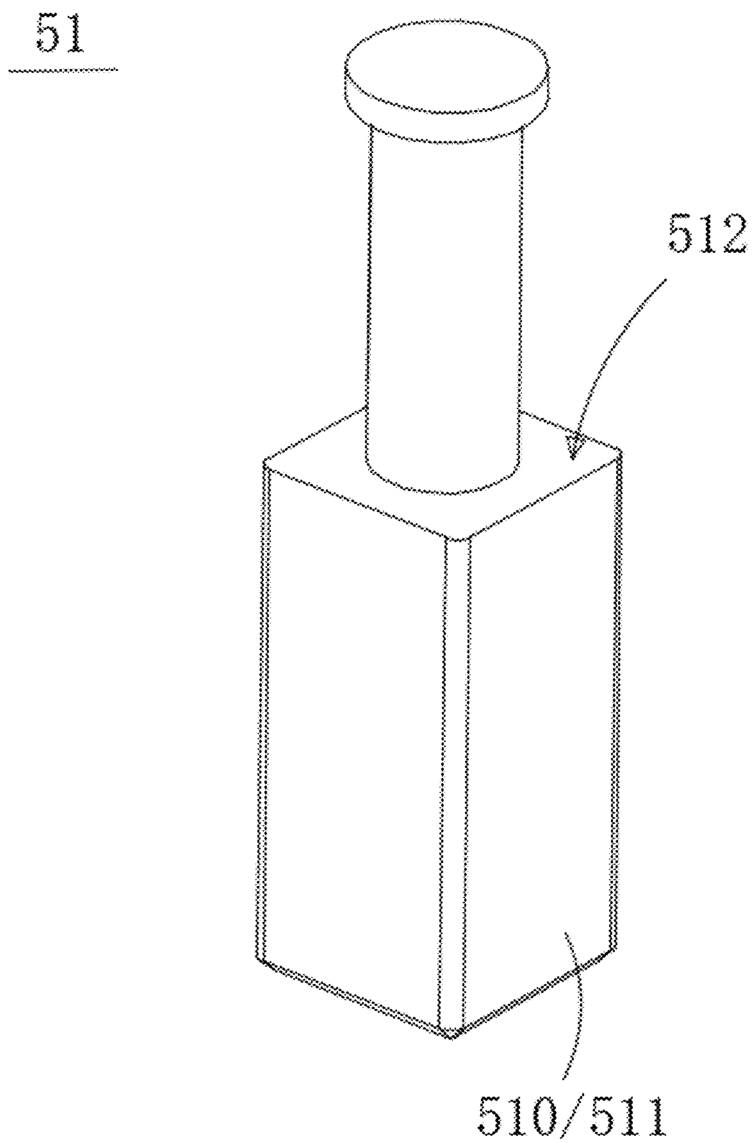
FIG. 10 is a structural view of a clutch shaft according to an embodiment of the present disclosure.

Regarding a structure of the clutch shaft 51, please refer to FIGS. 3, 4, and 10, in some embodiments, the transmission member 4 defines a polygonal shaft hole 421, and the working portion 510 is a polygonal column 511. A shape of the polygonal shaft hole 421 is matched with a shape of the polygonal column 511, and a size of the polygonal shaft hole 421 is matched with a size of the polygonal column 511. Compared to matching of a traditional circular shaft hole and circular column, the polygonal shaft hole 421 and polygonal column 511 can effectively prevent relative rotation between the clutch shaft 51 and the transmission member 4, ensuring synchronous rotation of the clutch shaft 51 and the transmission member 4 after the clutch shaft 51 is connected to the transmission member 4. The transmission member 4 includes a first end 41 and a second end 42. The first end 41 is connected to the lock rod 2, and the polygonal shaft hole 421 is formed in the second end 42. The polygonal column 511 of the clutch shaft 51 can be connected with the second end 42 of the transmission member 4 at the polygonal shaft hole 421 to rotate the lock rod 2 for unlocking.

Figure 12:
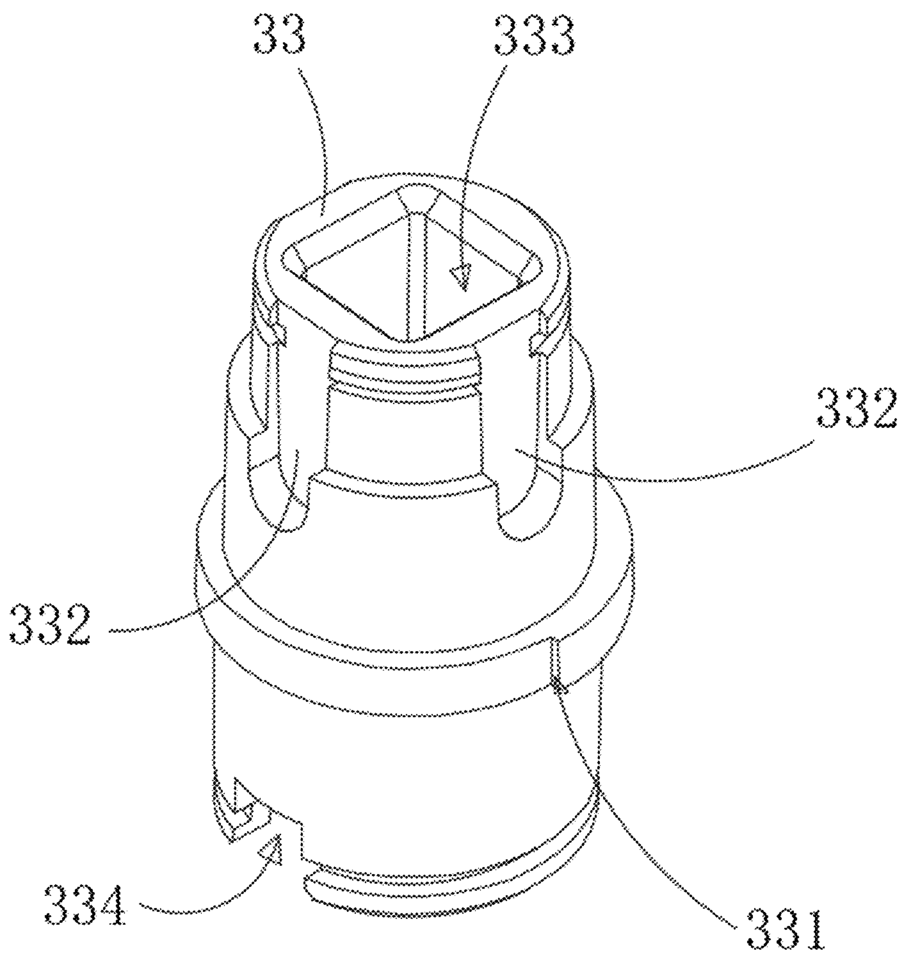
FIG. 12 is a structural view of an intermediate member according to an embodiment of the present disclosure.

To achieve synchronous rotation between the clutch shaft 51 and the gripping assembly 3, as shown in FIG. 12, the gripping assembly 3 defines a first channel 333. The first channel 333 is communicated to the mounting cavity 30. A shape of the first channel 333 is matched with the shape of the polygonal shaft hole 421, and a size of the first channel 333 is matched with the size of the polygonal shaft hole 421. When the clutch shaft 51 is in the initial state, at least a part of the polygonal column 511 is inserted in the first channel 333, and the at least a part of the polygonal column 511 is rotationally locked with the gripping assembly 3. That is, the clutch shaft 51 is rotationally locked with the gripping assembly 3 through the first channel 333, enabling the clutch shaft 51 to rotate along with the gripping assembly 3. Additionally, in one embodiment, the shape of the first channel 333 is matched with the shape of the polygonal shaft hole 421 of the transmission member 4, and the size of the first channel 333 is matched with the size of the polygonal shaft hole 421 of the transmission member 4. When the external force is applied to the driving member 52, the polygonal column 511 can slide along the first channel 333 and insert in the polygonal shaft hole 421 of the transmission member 4, thereby achieving a connection between the clutch shaft 51 and the transmission member 4.

In one embodiment, the gripping assembly 3 includes an intermediate member 33. It should be noted that the intermediate member 33 and the connecting member 55 can be embodied as a same structural component. When the switching assembly 6 is mounted on the gripping assembly 3, the structural component serves as the intermediate member 33; when the switching assembly 6 is mounted on the door lock panel 1, the structural component serves as the connecting member 55. The following explanation assumes the switching assembly 6 is mounted on the gripping assembly 3. Referring to FIGS. 2 and 3, the gripping assembly 3 includes a handle 31, an intermediate member 33, and a fixing member 34. The gripping portion 314 is arranged on the handle 31, and the mounting cavity 30 is formed in the handle 31. The intermediate member 33 is rotatably mounted on the door lock panel 1, and the fixing member 34 is fixedly connected to the handle 31 while being selectively connectable or separable from the intermediate member 33. When the fixing member 34 is separated from the intermediate member 33, the handle 31 can rotate relative to the intermediate member 33 and the clutch shaft 51 to adjust an initial position of the gripping portion 314. Specifically, the fixing member 34 is fixedly connected to the handle 31 via a bolt. Thus, when the fixing member 34 is connected to the intermediate member 33, the handle 31, fixing member 34, and intermediate member 33 can be regarded as an integral unit, and can rotate together about the rotation axis 37 of the gripping assembly 3. When the fixing member 34 is separated from the intermediate member 33, the handle 31 and fixing member 34 can be regarded as an integral unit, and can rotate relative to the intermediate member 33. After the fixing member 34 is separated from the intermediate member 33, the user can detach the handle 31 and internal components of the handle 31 from the door lock panel 1 while leaving the intermediate member 33 on the door lock panel 1, facilitating mounting and maintenance without removing the door lock panel 1.

Referring to FIG. 12, The intermediate member 33 defines a second channel 334. Each of the first channel 333 and the second channel 334 are formed in the intermediate member 33, and the first channel 333 and the second channel 334 are communicated with each other. A second end 42 of the transmission member 4 extends to the second channel 334. In this state, the gripping assembly 3 can rotate freely relative to the second end 42 of the transmission member 4. In one embodiment, the transmission member 4 includes a circular outer wall at the second end 42. The second channel 334 is arranged as a circular channel, a shape of the second channel 334 is matched with a shape of the circular outer wall, and a size of the second channel 334 is matched with a size of the circular outer wall, allowing the gripping assembly 3 to rotate relative to the transmission member 4 when the clutch shaft 51 is not connected to the transmission member 4, thereby preventing accidental door opening due to user misoperation.

Referring to FIGS. 2 to 5, in one embodiment, the gripping assembly 3 further includes a fixing bolt 36. Specifically, the handle 31 defines a third hole 313, and the fixing member 34 defines a fourth hole 341. The fixing bolt 36 passes through the third hole 313 and is threadedly connected to the fixing member 34 in the fourth hole 341, and ultimately the fixing bolt 36 is connected to the intermediate member 33. In this way, the intermediate member 33 and the fixing member 34 can be rotationally locked with each other via the fixing bolt 36. Rotating the fixing bolt 36 in an opposite direction can release a connection between the fixing member 34 and the intermediate member 33, thereby disengaging the rotational lock between the intermediate member 33 and the fixing member 34. A connection between the fixing bolt 36 and the intermediate member 33 can be achieved through threaded engagement or by direct abutment of the fixing bolt 36 against a face of the intermediate member 33, achieving the rotational lock between the intermediate member 33 and the fixing member 34 via an abutting force. For example, an outer wall of the intermediate member 33 defines a positioning slot 332. When the fixing bolt 36 extends to the positioning slot 332 and abuts against the intermediate member 33 at the positioning slot 332, the fixing member 34 and the intermediate member 33 are enabled to be rotationally locked with each other, and the gripping portion 314 is maintained in a preset position.

In one embodiment, the gripping portion 314 is arranged perpendicular to the rotation axis 37 of the gripping assembly 3. As shown in FIG. 13, the gripping portion 314 is approximately horizontal to the ground and extends in the X direction. In other embodiments, the gripping portion 314 may be horizontal but extend in an opposite direction of the X direction, or the gripping portion 314 may be vertical to the ground, extending in the Y direction. To facilitate user adjustment of the handle 31 and enable the gripping portion 314 to be oriented in a plurality of directions to suit different usage scenarios, in this embodiment, three positioning slots 332 are defined. The fixing bolt 36 can selectively extend to any one of the positioning slots 332, allowing the gripping portion 314 to correspond to the three aforementioned extension directions and flexibly adjust an orientation of the handle 31.

Figure 14:
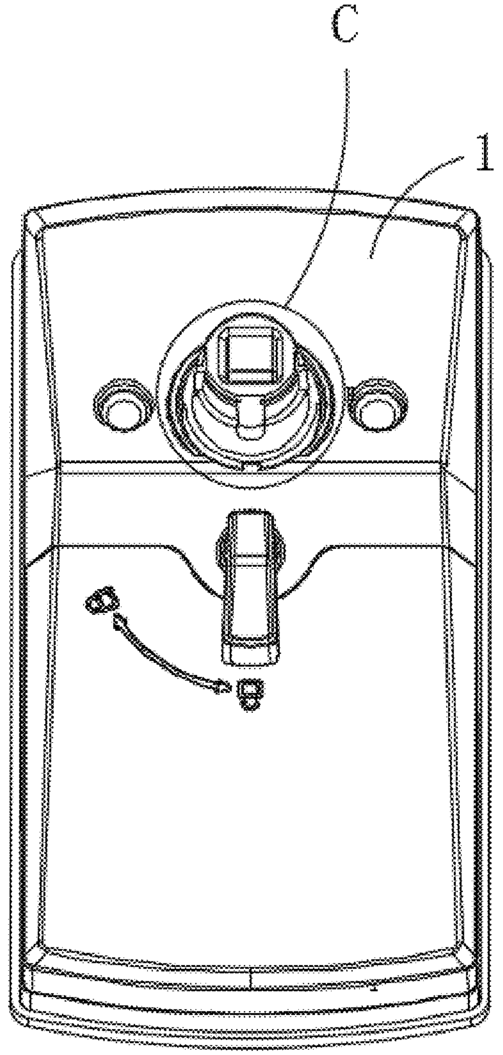
FIG. 14 is an assembly view of a connection assembly according to an embodiment of the present disclosure.
Figure 15:
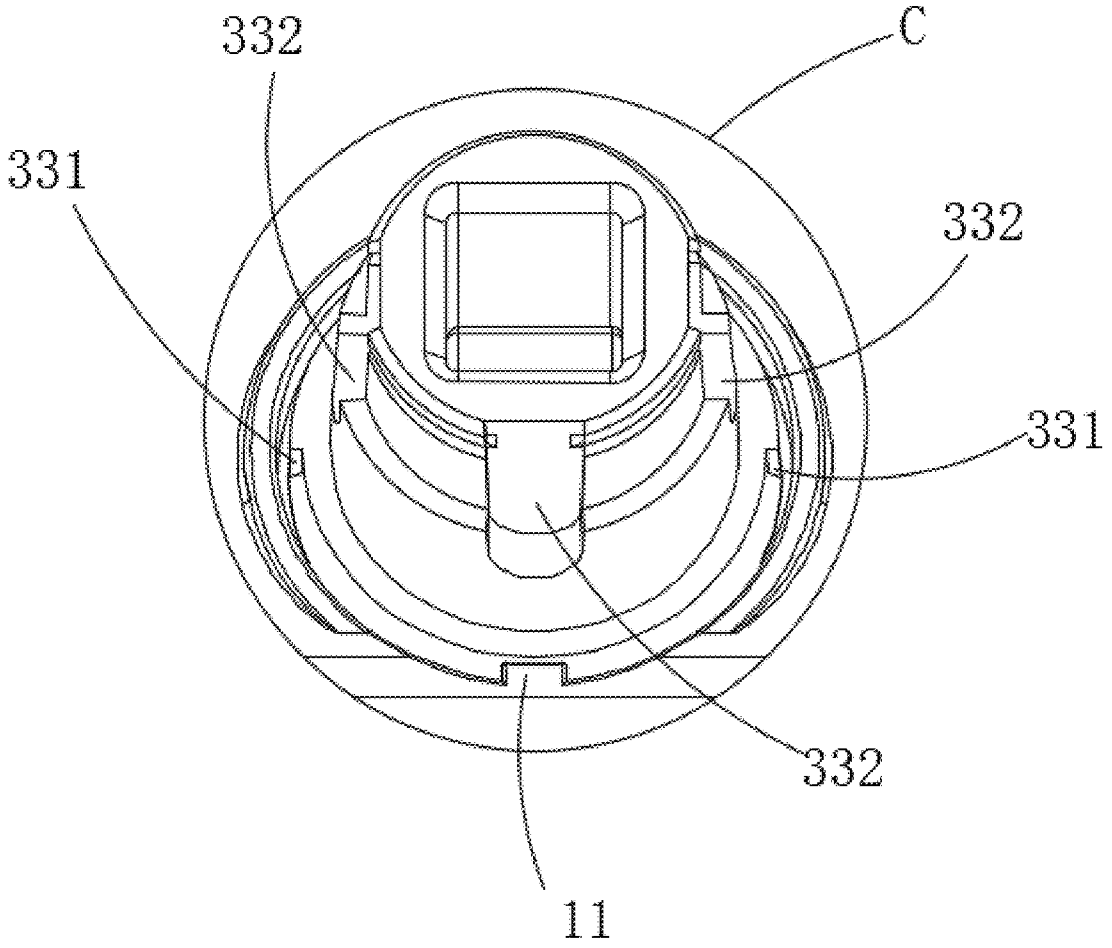
FIG. 15 is an enlarged view of a portion C in FIG. 14.

To limit a rotation range of the gripping assembly 3, referring to FIGS. 14 to 15, the door lock panel 1 is arranged with a first limiting protrusion 11, and an outer wall of the gripping assembly 3 is arranged with at least one second limiting protrusion 331. When the gripping assembly 3 rotates, the first limiting protrusion 11 abuts against the second limiting protrusion 331, thereby restricting a rotation angle of the gripping assembly 3 and preventing structural damage or functional abnormalities caused by excessive rotation. Specifically, in one embodiment, the second limiting protrusion 331 is arranged on the outer wall of the intermediate member 33, and the number of the at least one second limiting protrusion 331 is two. The two second limiting protrusions 331 are arranged to opposite to each other about the rotation axis 37 of the gripping assembly 3. The first limiting protrusion 11 is mounted between the two second limiting protrusions 331. In this way, regardless of whether the gripping portion 314 of the handle 31 extends in the X direction or the opposite direction of the X direction, the gripping assembly 3 cannot rotate beyond the limit when operated by the user.

In one embodiment, the anti-misoperation door lock includes a first torsion spring and a second torsion spring. The first torsion spring is arranged between the transmission member 4 and the door lock panel 1, an end of the first torsion spring is connected to the transmission member 4, and the other end of the first torsion spring is connected to the door lock panel 1. When the clutch shaft 51 is connected to the transmission member 4, the first torsion spring can drive the transmission member 4 to reset in an opposite direction after the transmission member 4 rotates. The second torsion spring is arranged between the gripping assembly 3 and the door lock panel 1, an end of the second torsion spring is connected to the gripping assembly 3, and the other end of the second torsion spring is connected to the door lock panel 1. When the clutch shaft 51 is not connected to the transmission member 4, the second torsion spring can drive the gripping assembly 3 to reset in an opposite direction after the gripping assembly 3 rotates.

Obviously, the embodiments described above are only a part of the embodiments of the present disclosure, and not all of them. The accompanying drawings give some embodiments of the present disclosure, but do not limit the patentable scope of the present disclosure, which may be realized in many different forms. Rather, these embodiments are provided for the purpose of providing a more thorough and comprehensive understanding of the present disclosure. Although the present disclosure has been described in detail with reference to the foregoing embodiments, it is still possible for a person skilled in the art to modify the technical solutions recorded in the foregoing specific embodiments or to make equivalent substitutions for some of the technical features therein. Any equivalent structure made by utilizing the contents of the specification and the accompanying drawings of the present disclosure, directly or indirectly applied in other related technical fields, are all the same within the scope of the patent protection of the present disclosure.

What is claimed is:

1. An anti-misoperation door lock, comprising a door lock panel, a lock rod, a gripping assembly, and a transmission member, wherein the gripping assembly is rotatable relative to the door lock panel, the lock rod is connected to the transmission member, and the transmission member is configured to drive the lock rod to rotate when the transmission member rotates; the anti-misoperation door lock further comprises:

a clutch assembly, movably arranged on the gripping assembly, wherein the gripping assembly is configured to drive the clutch assembly to rotate about a rotation axis of the gripping assembly when the gripping assembly rotates, the clutch assembly is configured to move axially along the rotation axis of the gripping assembly under an external force, and the clutch assembly has an initial state and a driving state; when the clutch assembly is in the initial state, the clutch assembly is spaced apart from the transmission member; when the clutch assembly is in the driving state, the clutch assembly is connected to the transmission member; and a switching assembly, having at least a first position and a second position relative to the gripping assembly and selectively arranged in the first position or the second position;

when the switching assembly is in the first position, the clutch assembly is switchable between the initial state and the driving state; when the switching assembly is in the second position, the switching assembly is connected to the clutch assembly, and the clutch assembly is kept in the driving state;

wherein the clutch assembly comprises a first abutting face, and the first abutting face is arranged facing away from the transmission member; the switching assembly comprises a second abutting face, and the second abutting face is arranged facing the first abutting face;

when the switching assembly is in the first position and the clutch assembly is in the driving state, the first abutting face and the second abutting face are spaced apart from each other; when the switching assembly is in the second position, the first abutting face abuts against the second abutting face.

2. The anti-misoperation door lock according to claim 1, wherein the clutch assembly comprises:

a clutch shaft, configured to move axially along the rotation axis of the gripping assembly and to be connected or disconnected with the transmission member; and a connecting member, wherein the clutch shaft is slidably connected to the connecting member, the connecting member is rotationally locked with the clutch shaft, and the gripping assembly is configured to drive the connecting member and the clutch shaft to rotate together about the rotation axis of the gripping assembly when the gripping assembly rotates;

when the switching assembly is in the second position, the connecting member is rotationally locked with the transmission member.

3. The anti-misoperation door lock according to claim 1, further comprising a first connection structure, a second connection structure, and a third connection structure, wherein each of the first connection structure and the second connection structure is arranged on one of the switching assembly and the gripping assembly, the third connection structure is arranged on the other of the switching assembly and the gripping assembly, and the third connection structure is configured to be selectively connected with the first connection structure or the second connection structure;

wherein when the third connection structure is connected to the first connection structure, the switching assembly is in the first position; when the third connection structure is connected to the second connection structure, the switching assembly is in the second position.

4. The anti-misoperation door lock according to claim 3, wherein the first connection structure is a first slot, the second connection structure is a second slot, the third connection structure is a buckle, and the buckle is configured to be selectively engaged in either of the first slot and the second slot.

5. The anti-misoperation door lock according to claim 3, wherein the gripping assembly comprises a handle and a mounting member, the handle defines a mounting cavity, the mounting member is fixedly arranged in the mounting cavity, each of the clutch assembly and the switching assembly is mounted on the mounting member, each of the first connection structure and the second connection structure is arranged on the switching assembly, and the third connection structure is arranged on the mounting member.

6. The anti-misoperation door lock according to claim 1, wherein the switching assembly comprises an abutting member and an operating member, the abutting member is arranged in the gripping assembly, the second abutting face is arranged on the abutting member, the gripping assembly defines a first hole, and the operating member is connected to the abutting member and at least partially exposed out of the gripping assembly through the first hole.

7. The anti-misoperation door lock according to claim 6, wherein the operating member extends in a direction perpendicular to the rotation axis of the gripping assembly.

8. The anti-misoperation door lock according to claim 7, wherein the operating member and the abutting member are detachably connected to each other, or the operating member and the abutting member are integrally formed as a one-piece structure.

9. The anti-misoperation door lock according to claim 1, wherein the gripping assembly defines a mounting cavity, the clutch assembly comprises:

a clutch shaft, movably arranged in the mounting cavity, wherein the first abutting face is arranged on the clutch shaft;

a driving member, configured to abut against or separate from the clutch shaft and move axially along the rotation axis of the gripping assembly, and at least a part of the driving member is exposed out of the gripping assembly from the mounting cavity; and a first reset member, arranged in the mounting cavity and connected to the clutch shaft and the gripping assembly, and configured to drive the clutch shaft to move away from the transmission member;

wherein when the switching assembly is in the first position, the driving member is capable of abutting against the clutch shaft under the external force, and the clutch shaft is connectable to the transmission member; after the external force is released, the first reset member drives the clutch shaft to separate from the transmission member; when the switching assembly is in the second position, the clutch shaft is connected to the transmission member.

10. The anti-misoperation door lock according to claim 9, wherein the clutch assembly comprises a second reset member, the second reset member is arranged in the mounting cavity and connected to the driving member and the gripping assembly, and configured to drive the driving member to move outward from the gripping assembly.

11. The anti-misoperation door lock according to claim 9, wherein the transmission member defines a polygonal shaft hole, at least a part of the clutch shaft is a polygonal column, a shape of the polygonal shaft hole is matched with a shape of the polygonal column, a size of the polygonal shaft hole is matched with a size of the polygonal column, the polygonal column is insertable in the polygonal shaft hole, and the transmission member is synchronously rotatable relative to the clutch shaft.

12. The anti-misoperation door lock according to claim 11, wherein the transmission member comprises a first end and a second end, the first end is connected to the lock rod, the polygonal shaft hole is formed in the second end;

the gripping assembly defines a first channel, the first channel is communicated to the mounting cavity, and a shape of the first channel is matched with the shape of the polygonal shaft hole, a size of the first channel is matched with the size of the polygonal shaft hole, the polygonal column is slidably arranged in the first channel, and the driving member is configured to drive the polygonal column to move from the first channel toward the polygonal shaft hole, and the polygonal column is insertable in the polygonal shaft hole.

13. The anti-misoperation door lock according to claim 12, wherein the gripping assembly comprises a handle, an intermediate member, and a fixing member, the mounting cavity is formed in the handle, the intermediate member is rotatably mounted on the door lock panel, the first channel is formed in the intermediate member, the intermediate member further defines a second channel communicated to the first channel, and the second end of the transmission member extends to the second channel;

the fixing member is fixedly mounted on the handle and is configured to be selectively connected or disconnected with the intermediate member, and when the fixing member is disconnected from the intermediate member, the handle is rotatable relative to the intermediate member and the clutch shaft.

14. The anti-misoperation door lock according to claim 13, wherein the gripping assembly further comprises a fixing bolt, the fixing bolt is threaded to the fixing member, passes through the fixing member, and is connectable to the intermediate member;

the fixing member and the intermediate member are rotationally locked with each other, or the fixing member and the intermediate member are rotationally unlocked from each other.

15. The anti-misoperation door lock according to claim 14, wherein the intermediate member defines at least one positioning slot, the fixing bolt is capable of extending to the at least one positioning slot, and when the fixing bolt extends to the at least one positioning slot, the fixing member and the intermediate member are rotationally locked with each other.

16. The anti-misoperation door lock according to claim 15, wherein the handle comprises a gripping portion, the number of the at least one positioning slot is three, and when the fixing bolt extends to a corresponding one of the three positioning slots, the gripping portion is horizontally or vertically arranged.

17. The anti-misoperation door lock according to claim 1, wherein the door lock panel is arranged with a first limiting protrusion, an outer wall of the gripping assembly is arranged with at least one second limiting protrusion, and the first limiting protrusion abuts against the at least one second limiting protrusion.

* * * * *